Nov. 14, 1950     G. J. CUNNINGHAM     2,529,919
AUTOMATIC CLUTCH FOR MOTOR BICYCLES
Filed Aug. 27, 1947     2 Sheets-Sheet 1
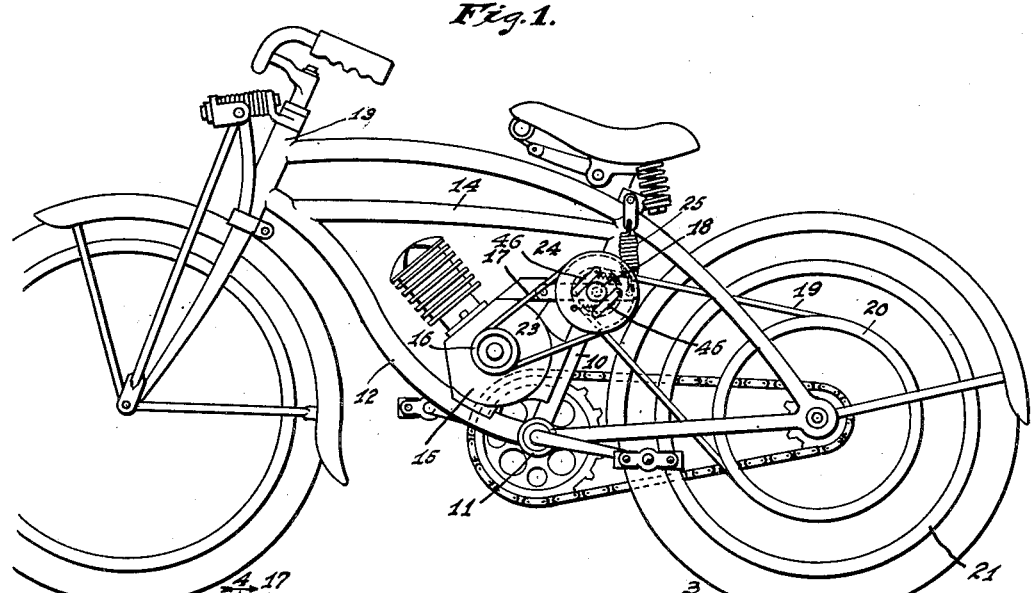
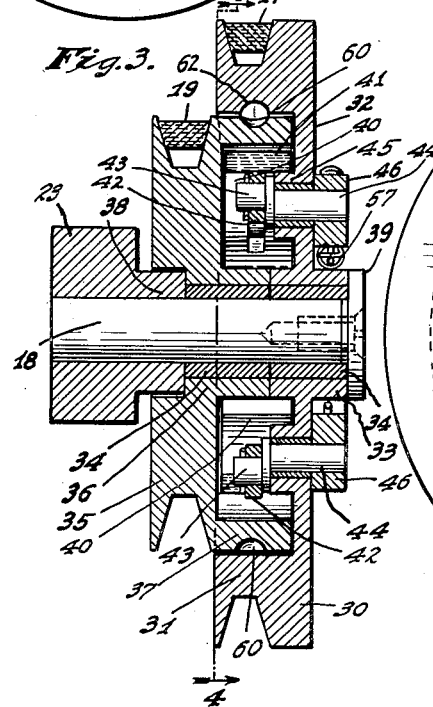
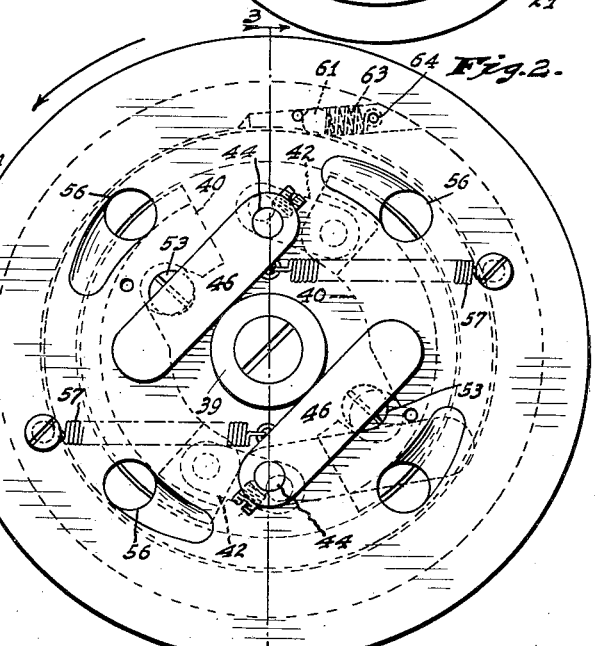
INVENTOR.
GEORGE J. CUNNINGHAM,
BY
*Schley Trask & Jenkins*
ATTORNEYS.

Nov. 14, 1950  G. J. CUNNINGHAM  2,529,919
AUTOMATIC CLUTCH FOR MOTOR BICYCLES
Filed Aug. 27, 1947  2 Sheets-Sheet 2
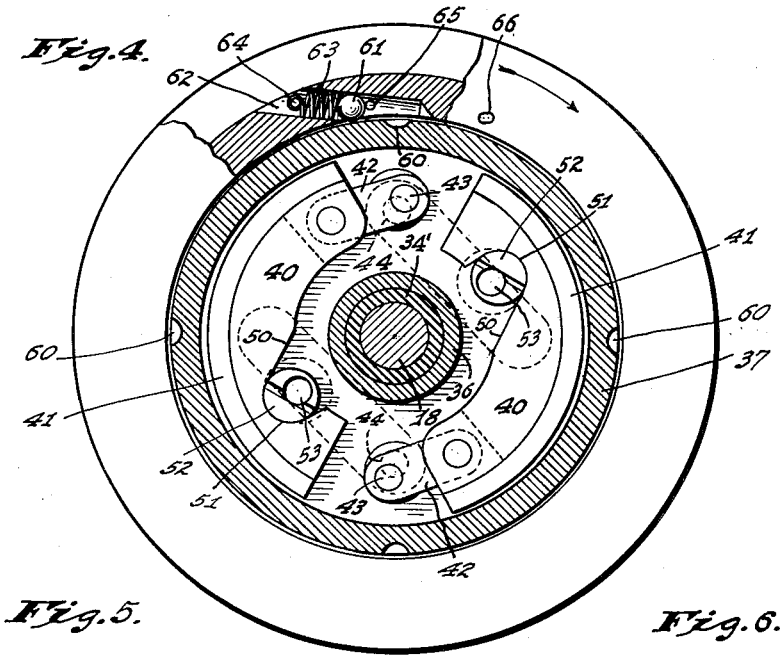
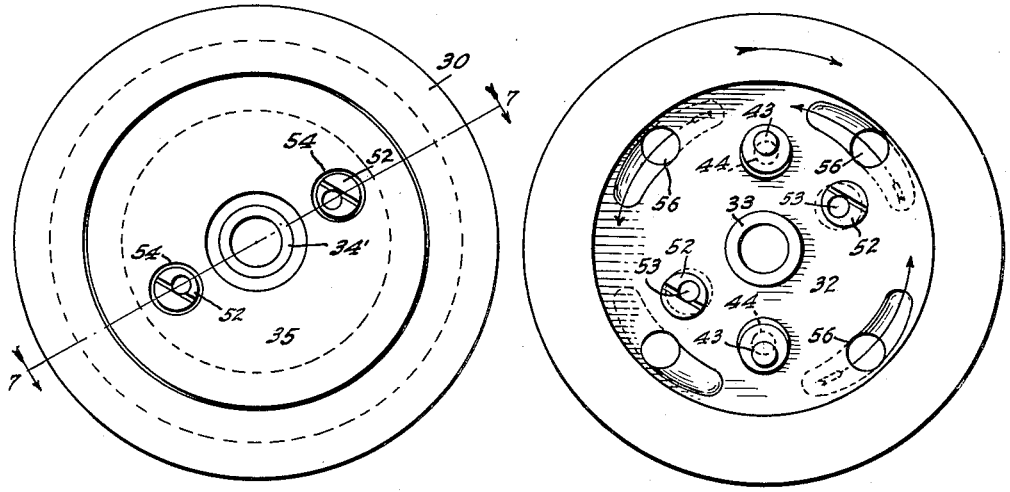
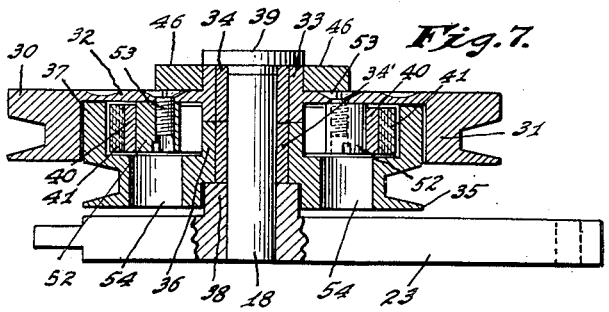
INVENTOR.
GEORGE J. CUNNINGHAM,
BY
ATTORNEYS.

Patented Nov. 14, 1950

2,529,919

UNITED STATES PATENT OFFICE 2,529,919

AUTOMATIC CLUTCH FOR MOTOR BICYCLES

George J. Cunningham, Indianapolis, Ind.

Application August 27, 1947, Serial No. 770,802

16 Claims. (Cl. 192—48)

This invention relates to a motor-bike, and more particularly to an automatic clutch for use in a motor-bike.

In a motor-bike of the type to which this invention relates, the motor is mounted above the crank hanger in a standard or modified bicycle frame, the motor shaft carries a pulley which is connected by a V-belt to a speed-reducing double pulley on a counter shaft, and such speed-reducing pulley is connected to a drive pulley of large diameter secured to the rear wheel of the bicycle. The counter shaft is placed well above a line between the motor shaft and the wheel axis, and is mounted on an arm yieldingly urged upward to tighten the belts but manually movable downward to slacken the belts and thereby to attain a de-clutching action. It is common practice in a motor-bike of this type, and the yielding upward pressure on the counter shaft support is often adjusted for this purpose, to obtain a power increase by slackening the belts sufficiently to obtain a partial slipping, and thus to permit the motor to operate at near its peak-power speed although driving the bicycle at less than the corresponding speed. This is a desirable and proper method of operation, and the availability of its use greatly simplifies the structure of the motor-bike; but it has several serious disadvantages, largely because the amount of slippage obtained is difficult to control and because it produces severe wear on the belts. Another pertinent factor in the operation of the standard motor bike is that the motor is started by pushing or pedaling the motor-bike forward with the belts in driving condition.

It is the object of my invention to provide a clutch which will automatically give this power-increasing effect, which will give such effect under automatic control, and which will be of simple construction. It is a further object of my invention to embody such a clutch in combination with a double pulley, of such size and characteristics that it may be embodied in the motor-bike by simple replacement of the standard double pulley by the double pulley and clutch combination. It is a further object of my invention to provide in combination with such a clutch, means by which it will automatically lock itself against over-running, to permit the motor to be started in the usual manner.

In carrying out my invention, I provide within the larger and motor-driven pulley a cavity of circular cross-section, and mount the smaller and wheel-driving pulley adjacent to and coaxial with the large pulley; and I provide on the small pulley a clutch drum lying within the cavity in the larger pulley and on the large pulley a pair of clutch shoes movable into clutching engagement with the drum. I move the clutch shoes into engagement with the drum in a path that gives a servo clutching action which is effective to transmit normal cruising power and which exerts itself substantially uniformly over the whole clutch faces, and I control the amount of clutching action obtained by opposing the servo action by spring means and opposing the spring means with centrifugal weights.

Preferably, I obtain the effective and uniform servo clutching action by making each shoe rigid and by providing a cam operable at a point spaced inwardly from its clutch face and intermediate its ends, desirably about two-thirds its length from its leading end, with the cam effective upon rearward movement of the shoe to press it outward against the clutch drum.

Preferably, I obtain control of the clutching action by linking the forward ends of the shoes to eccentrics, I connect springs thereto to urge the shoes forward out of servo action, and I mount centrifugal weights on the eccentrics to move the eccentrics against the springs and hence to permit the shoes to move into servo action by an amount depending upon the extent to which centrifugal force overcomes the spring opposition to such servo action.

By this means, the centrifugal system is primarily a control; and not only may it be made small and light enough to meet the space and weight limitations of the motor bike, but it combines with the servo clutch to give a highly effective and desirable clutch action. The servo action may be made such, by suitably inclining the cam, that it gives positive and uniform clutching without the necessity of any aid from the centrifugal system, yet clutching may be readily governed to permit slippage which varies gradually and proportionately with changes in speed over the range from cruising speed down to about idling speed. I thus obtain a nice balance between the firm clutch engagement needed for normal-load operations and the controlled slippage which will give peak-power operation of the motor under overload conditions.

To lock the clutch against over-running and thus to permit starting the motor in the usual way, I provide a second, but very simple, centrifugally releasable, over-running clutch which operates in reverse with respect to the first, to lock the two clutch parts together at and below the very low speeds normally occurring during starting operations; and I provide means to lock this second clutch in open position to permit free pedalling of the bicycle.

The accompanying drawings illustrate my invention. In such drawings, Fig. 1 is a side elevation of a motor-bike embodying my invention; Fig. 2 is an enlarged front elevation of the combination double pulley and clutch shown in Fig. 1; Fig. 3 is a section taken on the line 3—3 of Fig. 2; Fig. 4 is a section taken on the line 4—4 of Fig. 3; Fig. 5 is a rear elevation of the device shown in Fig. 2; Fig. 6 is a rear elevation of the large pulley, with the clutch shoes removed; and Fig. 7 is an axial section taken on the line 7—7 of Fig. 5.

A motor-bike embodying my invention is shown in Fig. 1. It includes a bicycle frame of usual construction including a seat-post tube 10 extending upwardly from a crank hanger 11, a tubular frame member 12 extending forwardly and upwardly from the hanger 11 to the steering post 13, and a cross bar 14 interconnecting the upper ends of the frame members 10 and 12. The motor 15 is mounted within the triangular space between these three frame members 10, 12, and 14, and is arranged to operate a driving pulley 16 at the left-hand side of the motor. The pulley 16 rotates in a counterclockwise direction and is connected by a belt 17 to the larger of two integral pulleys on a counter shaft 18. The smaller of these two pulleys is connected by a belt 19 to a ring sheave 20 secured to the rear wheel 21 of the bicycle. The bicycle is provided with the usual chain and sprocket drive operated by the pedals of the bicycle, and the hub of the rear wheel desirably includes the usual clutch and brake mechanism. The counter shaft 18 of the double pulleys is carried by an arm 23 pivoted at its forward end by a pivot pin 24, and urged upwardly by a spring 25, to maintain the belts tight.

In accordance with my invention, a special clutch is embodied in the double pulley assembly mounted on the counter shaft 18. As seen in Fig. 3, my clutch-pulley assembly includes a large pulley 30 which embodies the driving member of the clutch and is driven by the belt 17 from the motor pulley 16. It includes a rim 31 provided with a suitable V-belt pulley-groove, a web 32 which is displaced to the right as seen in Fig. 3, and a hub 33. The hub 33 is desirably mounted on a sleeve bearing 34, which in turn is received on the counter shaft 18. The smaller pulley 35 embodies the driven member of the clutch and has a hub 36 co-axial with the hub 33 and containing a bushing 34', and the rim of the smaller pulley 35 is provided with a V-belt pulley-groove to receive the driving belt 19. Extending to the left from the rim of the smaller pulley 35 there is a clutch drum 37 concentric with the inner face of the rim 31 of the larger pulley and telescoped within that rim 31.

Conveniently, a boss 38 is formed on the counter shaft bracket 23 in position to underlie the inner end of the sleeve bearing 34' and fit within a counter bore at the inner side of the smaller pulley 35, and the pulley and clutch assembly is held together on the counter shaft 18 by a washer 39 secured by a screw at the outer end of the counter shaft 18.

Within the clutch drum 37 there are a pair of clutch shoes 40 rotatable with the larger pulley 30 and supported from its web. As is seen in Fig. 4, each clutch shoe 40 is of rigid construction and carries a lining 41 for engagement with the clutch drum 37. At its leading end each clutch shoe 40 is connected by a short link 42 to an eccentric pin 43 carried at the inner end of an eccentric shaft 44. Each shaft is journaled through a boss 45 formed in the web 32 of the larger pulley 30, and at its outer end carries a centrifugal weight 46.

Toward its trailing end, desirably about two-thirds of the distance toward that trailing end, each clutch shoe is cut to form a cam surface 50 which is inclined away from the clutch drum 37 in the direction of the leading end of the clutch shoe 40, and the cam 50 rides on the surface of a cam-engaging stud 52. Toward the trailing end of the clutch shoe 40, the cam surface 50 merges into a semi-cylindrical surface 51 which in de-clutched position lies against the stud 52. The stud 52 is provided with an eccentric threaded bore to receive a mounting screw 53 by which it is mounted on the web 32 of the larger pulley 30. Rotation of the stud 52 about its mounting screw 53 adjusts its position with respect to the drum 37 and hence adjusts the clutch shoe 40 with respect to the clutch drum 37. For the purpose of this adjustment, the webbing of the smaller pulley 35 is provided with a pair of openings 54 which may be alined with the pins 52 to pass an adjusting tool, as shown in Figs. 5 and 7.

Desirably the web 32 of the larger pulley is provided with a circumferentially spaced series of air-admitting openings 56, each extending in a spiral through that web 32.

As may be seen in Fig. 2, the centrifugal weights 46 extend from the shafts 44 forward in the direction of rotation of the clutch assembly, and are adjustably fixed to their shafts 44 by set screws. Each centrifugal weight 46 is yieldingly urged inwardly by a spring 57 extending from an eye on the weight 46 to a mounting screw fixed in the rim of the larger pulley 30.

The outer surface of the clutch drum 37 is provided with one or more notches 60, and a clutch ball 61 is mounted for engagement with such notches 60 in a bore 62 through the rim 31 of the larger pulley 30. The bore 62 is inclined at a slight angle to a line tangent with the circumference of the clutch drum 37, and extends outward in a direction opposite to the direction of normal rotation of the larger pulley 30. Within the bore 62 the ball 61 is yieldingly urged toward its inner end by a spring 63 held in position by a pin 64.

To maintain the clutch ball 61 in retracted position, I provide a pin receiving opening 65 in such position that when a pin is inserted therein with the ball 61 resting against an un-notched portion of the clutch drum 37, such pin will engage the ball 61 off center, and will cam such ball outward in its bore 62 to a retracted position. Another pin receiving opening may be provided at another point to store a pin 66 for available use when and if it is desired to lock the clutch ball 61 in retracted position.

The firmness of clutch engagement obtained in the clutch described above will depend upon the character of clutch lining 41 which is used and upon the inclination of the cam surfaces 50. I preferably use on the clutch faces a firm lining of standard automobile brake lining material of the molded type rather than of the woven type. With this material, I employ an inclination of the cam surfaces 50 substantially as shown in Fig. 4, and find that this gives desirable results. The clutching effect to be obtained will vary, and may be varied in accordance with the designer's wishes, and modification of the effect may also be obtained by varying the spring strength and by adjustment of the centrifugal weights 46 on their shafts 44 to suit the desires of the user. To obtain the effect which the particular designer or user may desire, some experimentation with adjustments will of course be required, but such experimentation will be relatively simple and well within the skill of the art. In general the use of softer clutch lining material will soften the clutching action, as is known; a steeper inclination of the cam surfaces 50 will cause a more abrupt, and less desirable, clutching action; and adjustment of the centrifugal weights 46 about their shafts 44 toward the counter shaft 18 will cause engagement at a lower speed and more firm engagement at high speeds.

For starting, the motor-bike is pedaled or pushed forward in the usual way. During this operation, which is at relatively slow speed, the springs will hold the counter weights 46 retracted and the shoes in de-clutched position. The clutch ball 61, however, will be pressed by its spring 63 to a position between one of the notches 60 and the outer wall of its bore 62, where it will clutch the smaller pulley 35 into driving relation with the larger pulley 30 to drive the larger pulley 30 in motor-starting direction. Because of this clutching action of the ball, by forward rotation of the rear wheel 21 of the bicycle and of the small pulley 35 belted to it, the whole clutch and pulley assembly will be rotated in a counterclockwise direction as seen in Figs. 1 and 2 (or clockwise as seen in Fig. 4). This will rotate the larger pulley 30 to drive the motor pulley 16 and turn the motor in a proper starting direction.

When the motor takes hold and operates under its own power, the ball clutch 61 will at first over-run to permit the large pulley 30 to operate freely for a short period as the motor comes up to speed. Centrifugal force will then urge the ball 61 outward in its bore 62, to render the ball clutch inoperative at motor operating speeds.

As the motor 15 is started, and it and the larger pulley 30 increase speed, the centrifugal weights 46 will move progressively against the springs and outwardly from their positions shown in Fig. 2, to rotate their shafts 44 and move their eccentrics 43 in a direction toward the trailing ends of the clutch shoes 40. This will move the shoes 40 in that same direction, rearwardly of the direction of rotation of the clutch-driving member, and their cam surfaces 50 will cam against the studs 51 to move the shoes 40 outwardly into progressive engagement with the drum 37. Servo action will then become effective, exerting its additional opposition to the springs, and a progressively increasing smooth clutching effect will occur.

As the weights 46 move outward under centrifugal force, and the clutch shoes 40 move in the direction of their trailing ends and engage the clutch drum, such engagement tends to move the clutch shoes 40 in that same direction, to increase the clutching action. This gives the servo action, opposed by the springs 57 and controlled by the weights 46. The centrifugal system is primarily a control system and is not counted upon to force the clutch shoes into clutching engagement; but tends rather merely to govern the servo action, to reinforce it at high speeds and give more positive clutching, to oppose it at lower speeds and give the desired slippage under high load conditions, and to withdraw the shoes from the servo action at idling speeds and cause declutching.

The clutch readily gives the following desirable action. At top motor speeds and at cruising speeds, a firm clutching action is obtained. When an increased load is imposed and the motor speed is in consequence lowered, the springs 57 retract the weights 46 and pull the clutch shoes forwardly in position to the servo force, to relieve the camming action of the cam surfaces 50. This permits a controlled slippage which increases as the motor speed decreases, and permits the motor to operate at a speed to give effective power. When the increased load is overcome or passed, the motor speed again increases, the centrifugal force on the weights 46 also increases, and this in turn increases the clutching action. As a result, the motor speed is governed at a point close to its peak-power speed, and effective power is always exerted on the rear wheel. If the overload becomes excessive, the motor speed, and hence the centrifugal force on the weights 46, will reduce to a point where the motor will labor but will still continue to run without stalling. The clutch gives an over-running effect so that during coasting the motor may be slowed to its idling speed, yet upon opening of its throttle it will smoothly pickup the driving load.

I claim as my invention:

1. A motor-bike clutch, comprising a clutch driving-member, a clutch driven-member, a clutch drum on said driven member, clutch shoes on said driving member and movable rearwardly of the normal direction of rotation thereof, means operative upon such rearward movement to progressively force said shoes outward into uniform clutching engagement with said drum, whereby said clutch has a servo action, spring means connected to urge said clutch shoes forward in opposition to their rearward movement by said servo action and capable of overcoming said servo action, and centrifugal means connected to said shoes to oppose the force of said spring means and effective to overcome it at normal cruising speeds of said driving member but substantially ineffective against it at idling speeds.

2. A motor-bike clutch, comprising a clutch driving-member, a clutch driven-member, a clutch drum on said driven member, clutch shoes on said driving member and movable rearwardly of the normal direction of rotation thereof, cam means positioned intermediate the ends of each shoe and rearwardly of its mid point and operable upon rearward movement of its shoe to force its shoe outward into substantially uniform clutching engagement with said drum, an eccentric positioned forward of each shoe and linked thereto, spring means operable to rotate said eccentric to pull its shoe forwardly out of cammed engagement with said drum, and centrifugal weights connected to said eccentrics and operable during rotation of said driving member to oppose said spring means and permit said shoes to move rearward into cammed engagement with said drum.

3. A motor-bike clutch, comprising a clutch driving-member, a clutch driven-member, a clutch drum on said driven member, clutch shoes carried by said driving member and movable rearwardly of the normal direction of rotation thereof, means operative upon such rearward movement to progressively force said shoes outward into uniform clutching engagement with said drum, whereby said clutch has a servo action, an eccentric positioned forward of each shoe and linked thereto, spring means operable to rotate said eccentric to pull its shoe forwardly out of cammed engagement with said drum, and centrifugal weights connected to said eccentrics and operable during rotation of said driving member to oppose said spring means and permit said shoes to move rearward into cammed engagement with said drum.

4. In combination with a motor-bike clutch as defined in claim 1, a clutch carried by said driving member outside said drum and operable at low speeds of said driving member to lock it against over-running of said drum in motor-starting direction, said clutch permitting over-running of said driving member and movable under centrifugal force to disengaged position.

5. In combination with a motor-bike clutch as defined in claim 2, a clutch carried by said driving member outside said drum and operable at low speeds of said driving member to lock it against over-running of said drum in motor-starting direction, said clutch permitting over-running of said driving member and movable under centrifugal force to disengaged position.

6. A motor-bike clutch as defined in claim 5 in combination with interengaging means between said shoes and driving member and coming into engagement at the limit of forward movement of said shoes to move said shoes out of engagement with said drum.

7. In combination with a motor-bike clutch as defined in claim 1, a bore in the rim of said driving member and overlying the outer surface of said drum, said bore being inclined outward from a tangent of said drum, and rearward from the direction of normal rotation of said driving member, a ball in said bore movable into clutching engagement with said drum to permit said drum to drive said driving member, said ball being movable out of clutching position by over-running of said driving member, and adapted to be held in inoperative position by centrifugal force at normal operating speeds.

8. In combination with a motor-bike clutch as defined in claim 2, a bore in the rim of said driving member and overlying the outer surface of said drum, said bore being inclined outward from a tangent of said drum, and rearward from the direction of normal rotation of said driving member, a ball in said bore movable into clutching engagement with said drum to permit said drum to drive said driving member, said ball being movable out of clutching position by over-running of said driving member, and adapted to be held in inoperative position by centrifugal force at normal operating speeds.

9. A motor-bike clutch as defined in claim 2 in combination with interengaging means between said shoes and driving member and coming into engagement at the limit of forward movement of said shoes to move said shoes out of engagement with said drum.

10. A motor-bike clutch, comprising a clutch driving-member, a clutch driven-member adapted to be clutched to said driving member, a clutch drum on said driven member, clutch shoes carried by said driving member for movement into clutching engagement with said drum, a cam-engaging face carried with said drum for each clutch shoe, a cam surface on each clutch shoe positioned to engage its associated cam-engaging face and inclined to cause servo clutching action between the clutch shoe and the drum, centrifugal weights carried by said driving member and operable under centrifugal force to cause said clutch shoes to move into the control of said servo action, and spring means opposing said movement of the weights.

11. A motor-bike clutch comprising a clutch driving-member, a clutch driven-member adapted to be clutched to said driving member, a clutch drum on said driven member, a rigid clutch shoe carried by said driving member, a cam engaging stud fixed to said driving member, and a cam surface on said clutch shoe adapted to ride on said stud to move said clutch shoe in a path having a component toward said clutch face and a component toward the trailing end of said clutch shoe, said cam and cam engaging means being arranged to operate adjacent the middle of said clutch shoe and to press said shoe into substantially uniform engagement with said drum, an eccentric linked to the leading end of said clutch shoe, spring means to rotate said eccentric to urge said shoe toward disengaged position, and means operable under the influence of centrifugal force to oppose said spring means and rotate said eccentric to move said shoe toward clutching position.

12. A motor-bike clutch as defined in claim 11 in combination with means to engage the rear face of said stud operable during final forward movement of said clutch shoe to carry said shoe to a fixed disengaged position.

13. A motor-bike clutch, comprising a clutch driving-member, a clutch driven-member, a clutch drum on said driven member telescoped within said driving member, clutch shoes carried by said driving member within said clutch drum and arranged to have a servo clutching action therewith, spring means urging said clutch shoes to disengaged position, means responsive to centrifugal force to oppose said spring means and effective to carry said clutch shoes into servo-clutching engagement with said drum above predetermined speeds of said driving member, a second clutch means carried by said driving member outside said clutch drum and operable below said predetermined speed to clutch said driven member into driving relation with said driving member in a motor-starting direction, said second clutch being adapted to permit over-running of said driving member and to move under centrifugal force to inoperative position at motor driven speeds of said driving member.

14. A motor-bike clutch, comprising a clutch driving-member, a clutch driven-member, a clutch drum on said driven member telescoped within said driving member, clutch shoes carried by said driving member within said clutch drum and arranged to have a servo clutching action therewith, spring means urging said clutch shoes to disengaged position, means responsive to centrifugal force to oppose said spring means and effective to carry said clutch shoes into servo-clutching engagement with said drum above predetermined speeds of said driving member, said driving member being provided with a bore at a point overlying the outside of said clutch drum, said bore being inclined at a slight angle to a tangent of the outer surface of said clutch drum and extending outward in a direction opposite to the direction of normal rotation of said driving member, a clutch ball in said bore and movable inwardly therein into engagement with the outer surface of said clutch drum whereby to clutch said drum into driving relation with said driving member for rotation thereof in motor starting direction, said ball being adapted to be moved outwardly in its bore both by over-running action of said driving member and by centrifugal force at motor driven speeds of said driving member.

15. A motor-bike clutch, comprising a larger pulley adapted to be motor-driven and including a grooved rim and an offset web, a smaller pulley adapted to drive a wheel and including a grooved rim and a clutch drum, said clutch drum being telescoped within the rim of the larger pulley, clutch shoes carried by the web of said larger pulley within said clutch drum, cam studs carried by said web and cams on said shoes operable thereagainst to force said shoes into clutching engagement upon rearward movement thereof, an eccentric journalled in said web ahead of each shoe and linked to the forward end thereof, centrifugal weights mounted on the projecting ends of the shafts of said eccentrics and movable under centrifugal force to move said shoes into clutch operating engagement with said cam studs, and springs connected to said weights to oppose said movement thereof.

16. A motor-bike clutch as defined in claim 15 in which said studs are mounted on said web by eccentric supports, said studs being adjustable about said supports to adjust the clutch action.

GEORGE J. CUNNINGHAM.

REFERENCES CITED

The following references are of record in the file of this patent:

UNITED STATES PATENTS

| Number | Name | Date |
| --- | --- | --- |
| 503,984 | Palmer et al. | Aug. 29, 1893 |
| 1,587,410 | Pepin | June 1, 1926 |
| 1,978,834 | Cotterman | Oct. 30, 1934 |
| 2,001,931 | Lyman | May 21, 1935 |
| 2,087,968 | Dodge | July 27, 1937 |
| 2,286,461 | Burns | June 16, 1942 |